United States Patent
Law

(10) Patent No.: US 8,533,403 B1
(45) Date of Patent: Sep. 10, 2013

(54) ARBITRATION UNIT FOR MEMORY SYSTEM

(75) Inventor: Patrick Y. Law, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 12/895,036

(22) Filed: Sep. 30, 2010

(51) Int. Cl.
*G06F 13/37* (2006.01)

(52) U.S. Cl.
USPC .......................... 711/151; 711/105; 711/158

(58) Field of Classification Search
USPC .......................................... 711/151, 105, 158
See application file for complete search history.

(56) References Cited

U.S. PATENT DOCUMENTS

| | | | |
|---|---|---|---|
| 6,026,464 A | 2/2000 | Cohen | |
| 7,143,219 B1 * | 11/2006 | Chaudhari et al. | 710/111 |
| 7,308,526 B2 | 12/2007 | Lakshmanamurthy et al. | |
| 7,518,996 B2 | 4/2009 | Mayhew et al. | |
| 7,565,475 B2 | 7/2009 | Purcell et al. | |
| 7,672,243 B2 | 3/2010 | Mayhew | |
| 2009/0235108 A1 | 9/2009 | Gold et al. | |
| 2010/0077267 A1 | 3/2010 | Perego et al. | |
| 2010/0097874 A1 * | 4/2010 | Hoffmann | 365/222 |
| 2012/0179880 A1 * | 7/2012 | Ware et al. | 711/148 |

FOREIGN PATENT DOCUMENTS

WO 2008077244 7/2008

* cited by examiner

*Primary Examiner* — Yong Choe

(57) ABSTRACT

Techniques are disclosed relating to maximizing utilization of memory systems within power constraints of the memory systems. In one embodiment, an integrated circuit may include multiple memory controllers and an arbitration unit. Each memory controller may be configured to generate requests to perform memory operations on one or more portions of memory. The arbitration unit may be configured to grant no more than a specified number of requests during a time window $T_W$. In some embodiments, a voltage converter that supplies power to the memory system may be configured to supply power to perform no more than the specified number of requests during the time window $T_W$. The arbitration unit may thus be used, in some embodiments, to ensure that the greatest possible number of the specified number of memory requests are granted during a given time window $T_W$ (without exceeding the specified number).

21 Claims, 7 Drawing Sheets

ARBITRATION UNIT FOR MEMORY SYSTEM

BACKGROUND

1. Technical Field

This disclosure relates generally to processors, and, more specifically, to random access memory (RAM) used by processors.

2. Description of the Related Art

As processing demands for integrated circuits increase, developers are designing new memory systems to support these integrated circuits. Such memory systems now have greater storage capabilities and faster access times. Memory systems may also include multiple memory banks, which may be accessible by multiple memory controllers via separate channels. These improvements, however, can consume greater amounts of power and complicate power management, especially on mobile devices such as personal digital assistants (PDAs), cell phones, smart phones, laptop computers, net top computers, etc.

In order to guarantee that memory systems do not exceed certain power constraints, developers may specify certain power restrictions for those systems.

SUMMARY

This disclosure describes techniques and structures that facilitate access to a memory system. In one embodiment, a memory system is accessible via two or more memory controllers, each of which is configured to generate requests for memory operations (e.g., activation requests or refresh requests). An arbitration unit may be used to receive and grant such requests. In one embodiment, the arbitration unit and the memory controllers are located on a common integrated circuit. For a memory system having a voltage converter configured to generate power for up to N memory operations during a specified time period, the arbitration unit may be designed such that it does not grant more that N requests during the specified time period. The arbitration unit may, in some instances, permit efficient usage of the memory system without exceeding the memory's specified power constraints. One exemplary power constraint is a time period $T_{FAW}$. $T_{FAW}$ specifies the time period (e.g., 60 ns) required for a memory system's voltage converter to generate sufficient power to perform four memory activations. Thus, for a system having a $T_{FAW}$ parameter, an arbitration unit may be configured to ensure that no more than four activation requests are granted during a given window of time equal to $T_{FAW}$.

In one embodiment, the two or more memory controllers may each access portions of the memory system that are different, but that share a common voltage converter. The present techniques and structures may be advantageous in instances in which the output of the voltage converter is insufficient, such as when the two or more memory controllers are each configured to independently initiate memory operations. As one example, the use of an arbitration unit may be beneficial in certain configurations (e.g., Wide IO DRAM) in which multiple memory channels are located on the same die, the channels share a voltage converter within the memory system, and the memory controllers for the memory channels operate independently of one another.

DETAILED DESCRIPTION OF EMBODIMENTS

Figure 1:
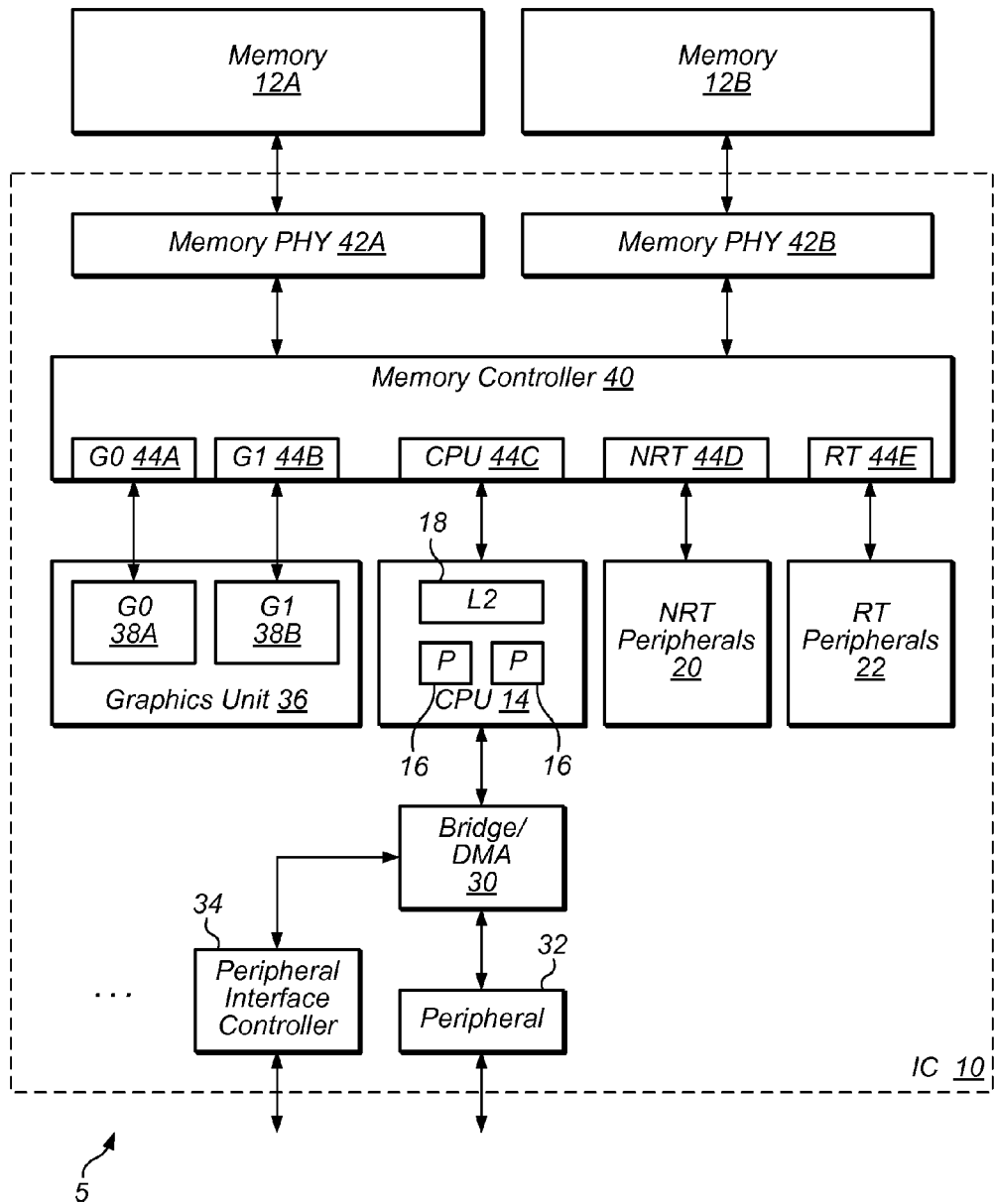
FIG. 1 is a block diagram of one embodiment of an integrated circuit.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware— for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"First," "Second," etc. As used herein, these terms are used as labels for nouns that they precede, and do not imply any type of ordering (e.g., spatial, temporal, logical, etc.). For example, in an apparatus having four memory controllers, the terms "first" and "second" memory controllers are used to refer to any two different ones of the four controllers. Thus, the "first" and "second" memory controllers are not limited to some ordering that might be assigned by the apparatus.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Processor." This term has its ordinary and accepted meaning in the art, and includes a device that is capable of executing computer instructions. A processor may refer, without limitation, to a central processing unit (CPU), a co-processor, an arithmetic processing unit, a graphics processing unit, a digital signal processor (DSP), etc. A processor may be a superscalar processor with a single or multiple pipelines. A processor may include a single or multiple cores that are each configured to execute computer instructions.

"Activation." This term has its ordinary and accepted meaning in the art, and includes accessing a row in a bank of memory (e.g., dynamic random access memory or DRAM) and reading the contents of that row. In some instances, an activation may be referred to as a row address strobe (RAS). Memory activations are performed during read, write, or refresh operations.

"Refresh." This term has its ordinary and accepted meaning in the art, and includes the process of accessing a row in a memory bank, thus automatically refreshing the contents of its bit cells. Refreshing is typically performed on DRAM.

"Time Window." As used herein, this term refers to a duration of time (as opposed to a single instance of time). Embodiments are described herein in which a memory unit is configured to perform a specified number (e.g., N) of memory operations (e.g., activations and refreshes). For example, in one embodiment, a memory unit may be configured to perform four memory operations during a time window of 60 ns. Thus, in this embodiment, the "time window" may refer to any given period of 60 ns while the memory unit is in an appropriate operating mode (e.g., it is not turned off).

Introduction

The present disclosure describes various techniques for facilitating efficient usage of memory systems. As will be described below, memory systems may perform various operations that consume power. In some instances, a voltage converter providing power to the memory system may be able to supply only enough power to perform a specific number of memory operations within a given time window (stated another way, a voltage converter may be configured to supply only enough power to perform memory operations at a specified rate). If the memory system attempts to perform more than this supported number of memory operations, sufficient power may not be available to perform each operation. On the other hand, if a memory system does not perform as many memory operations as possible during the given time window, system performance will suffer. As will be described below, an arbitration unit may remedy one or both of these problems in various embodiments. An arbitration unit as described herein may prevent a memory system from performing too many memory operations in a given time window, by limiting how frequently certain operations are performed within the time window. In one embodiment, this limiting may be performed by using credits to determine which requests from memory controllers may be granted.

The present disclosure first provides, with reference to FIG. 1, an overview of a system on a chip (SoC), which includes one or more processors (or cores). The techniques and structures described herein are in no way limited to an SoC environment; rather, this context is provided only as one possible environment for implementation. Next, techniques for managing power consumption of a memory system are described in conjunction with FIGS. 2-8. Finally, an exemplary computer that may include the chip is described in conjunction with FIG. 9.

Overview of a System on a Chip

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the CPU block 14 is coupled to a bridge/direct memory access (DMA) controller 30, which may be coupled to one or more peripheral devices 32 and/or one or more peripheral interface controllers 34. The number of peripheral devices 32 and peripheral interface controllers 34 may vary from zero to any desired number in various embodiments. The system 5 illustrated in FIG. 1 further includes a graphics unit 36 comprising one or more graphics controllers such as G0 38A and G1 38B. The number of graphics controllers per graphics unit and the number of graphics units may vary in other embodiments. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44E. The ports 44A-44B are coupled to the graphics controllers 38A-38B, respectively. The CPU block 14 is coupled to the port 44C. The NRT peripherals 20 and the RT peripherals 22 are coupled to the ports 44D-44E, respectively. The number of ports included in a memory controller 40 may be varied in other embodiments, as may the number of memory controllers. That is, there may be more or fewer ports than those shown in FIG. 1. The number of memory PHYs 42A-42B and corresponding memories 12A-12B may be one or more than two in other embodiments.

Generally, a port may be a communication point on the memory controller 40 to communicate with one or more sources. In some cases, the port may be dedicated to a source (e.g. the ports 44A-44B may be dedicated to the graphics controllers 38A-38B, respectively). In other cases, the port may be shared among multiple sources (e.g. the processors 16 may share the CPU port 44C, the NRT peripherals 20 may share the NRT port 44D, and the RT peripherals 22 may share the RT port 44E. Each port 44A-44E is coupled to an interface to communicate with its respective agent. The interface may be any type of communication medium (e.g. a bus, a point-to-point interconnect, etc.) and may implement any protocol. The interconnect between the memory controller and sources may also include any other desired interconnect such as meshes, network on a chip fabrics, shared buses, point-to-point interconnects, etc.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripheral 32 and/or peripherals coupled to a peripheral interface controlled by the peripheral interface controller 34 may also be non-real time peripherals, but may not require independent access to memory. Various embodiments of the NRT peripherals 20 may include video encoders and decoders, scaler circuitry and image compression and/or decompression circuitry, etc.

The RT peripherals 22 may include any peripherals that have real time requirements for memory latency. For example, the RT peripherals may include an image processor and one or more display pipes. The display pipes may include circuitry to fetch one or more frames and to blend the frames to create a display image. The display pipes may further include one or more video pipelines. The result of the display pipes may be a stream of pixels to be displayed on the display screen. The pixel values may be transmitted to a display controller for display on the display screen. The image processor may receive camera data and process the data to an image to be stored in memory.

The bridge/DMA controller 30 may comprise circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g. source and destination addresses, size, etc.). Alternatively, the DMA controller may be programmable via registers in the DMA controller (not shown).

The peripherals 32 may include any desired input/output devices or other hardware devices that are included on the integrated circuit 10. For example, the peripherals 32 may include networking peripherals such as one or more networking media access controllers (MAC) such as an Ethernet MAC or a wireless fidelity (WiFi) controller. An audio unit including various audio processing devices may be included in the peripherals 32. One or more digital signal processors may be included in the peripherals 32. The peripherals 32 may include any other desired functional such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Memory System

Figure 2:
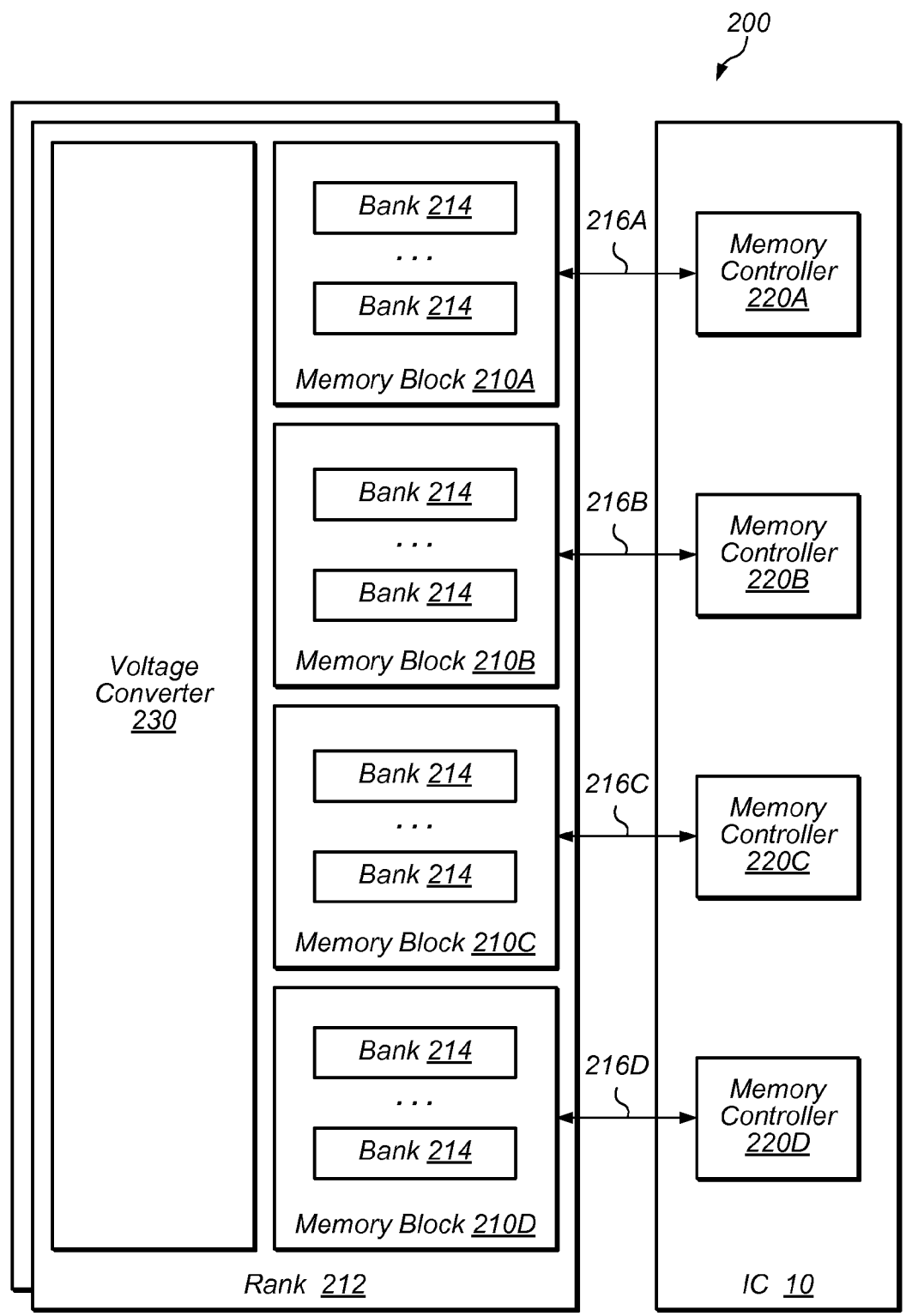
FIG. 2 is a block diagram of one embodiment of a memory system that may be used by the integrated circuit.

Turning now to FIG. 2, a block diagram illustrating one embodiment of memory system 200 is depicted. In some embodiments, memory system 200 may be used in conjunction with IC 10 described above. In other embodiments, memory system 200 may be used in conjunction with other suitable integrated circuits that include structures that make requests to memory system 200 to perform memory operations. In the illustrated embodiment, memory system 200 includes exemplary rank 212, which includes memory blocks 210A-D, and voltage converter 230. Each memory block 210 is coupled to a respective one of memory controllers 220A-D via a respective one of communication channels 216 A-D.

Memory blocks 210, in some embodiments, represent portions of RAM that may be accessible to IC 10. Memory blocks 210 may include any suitable types of memory such as those described above in conjunction with memories 12A-

12B. In some embodiments, memory blocks 210 may include RAM that is be compatible with the Joint Electron Devices Engineering Council (JEDEC) Wide-IO DRAM standard. In illustrated embodiment, each rank 212 includes one or more memory blocks 210 that, in turn, include one or more memory banks 214. In some embodiments, each rank 212 may correspond to a separate memory module (e.g., a single inline memory module (SIMM), a dual in-line memory module (DIMM), etc.). In some embodiments, multiple ranks 212 may be included on a single memory module. In the illustrated embodiment, one memory block 210 is separately accessible by one of controllers 220 relative to another memory block 210.

Voltage converter 230, in one embodiment, comprises one or more charge pumps located on rank 212. Typically, a memory such as a DRAM is supplied with a number of voltage rails: Core, IO, etc. For some applications (e.g., mobile devices), some voltage rails are eliminated for space reasons, and are instead generated internally using charge pumps. In one embodiment, a charge pump is a series of cascading capacitors that are charged to a low voltage, but which are connected in series to form a higher voltage. Thus, voltage converter 230 may, in one embodiment, receive 1.2 V from a power supply (not shown) that is connected to the battery (this power supply may be located on a printed circuit board with IC 10 in on embodiment), and in turn generate 1.8 V for use by the memory blocks 210.

Memory controllers 220, in one embodiment, are configured to receive requests from IC 10 and to provide corresponding commands to memory blocks 210 to cause performance of various memory operations. In the illustrated embodiment, each memory controller 220 is configured to send commands to a memory block 210 using a respective channel 216 (e.g., memory bus) corresponding to that block 210. In some embodiments, each memory block 210 may be configured to receive commands from only one memory controller 220. In other embodiments, multiple memory controllers 220 are configured to send commands to the same memory block 210.

In one embodiment, memory controllers 220 are configured to receive I/O requests (i.e., read or write requests) and, for a given request, to send a corresponding set of commands to a rank 212 associated with that request. For example, upon receiving I/O request, a memory controller 220, in one embodiment, is configured to send an activation command (i.e., a row address strobe (RAS) command) that causes a rank 212 to load a row into an accessible register. The memory controller 220 may be configured to then send a column address strobe (CAS) command identifying one or more columns in the loaded row. If the I/O request is a write request, the CAS command, in one embodiment, may also include data that is to be written into the loaded row and stored back into a bank 214. If the I/O request is a read operation, the rank 212, in one embodiment, is configured to provide the requested to data to the memory controller after receiving the CAS command. In one embodiment, the memory controller 220 is configured to provide the requested data to IC 10 upon receiving it.

In one embodiment, memory controllers 220 are configured to generate refresh requests (e.g., auto-refresh requests) based on a timer (e.g., an internal timer). Alternately, controllers 220 are configured to receive refresh requests from IC 10, and to provide corresponding refresh commands to ranks 212. In one embodiment, upon receiving a refresh command, a rank 212 is configured to read the contents of one or more rows in a bank 214; this read performs a refresh of memory cell contents. Different types of auto-refresh operations are possible. In one possible type (an "all-bank" auto refresh), the DRAM sequences a series of refresh commands to refresh all its banks. In another type ("per-bank"), memory controller 220 specifies which particular bank(s) to refresh.

Although the present disclosure is not limited in its applicability, the arrangement shown in FIG. 2 may correspond to a Wide IO DRAM memory system. In one embodiment, a Wide IO DRAM memory system may be organized as multiple channels (e.g., 4 channels) on a single die, where each channel includes multiple banks (e.g., 4 banks) Further, multiple Wide IO dies may be organized together such that each die corresponds to a different memory rank. In this type of configuration, a situation may result in which multiple channels (each corresponding to a different memory controller 220) are located on the same die and share the same charge pump. In situations in which these memory controllers 220 are independent of one another (i.e., each controller can simultaneously issue a memory activation and is "unaware" of the other controllers' actions), this arrangement could overwhelm the charge pump unless a timing restriction is used to limit the activation rate per channel in the worst-case scenario.

In other words, since charging capacitors takes time and voltage converter 230 includes a limited number of charge pumps (each having a limited size), voltage converter 230 may be configured to perform only a specific number of charge operations within a given period of time. Thus, system 200 may be configured to successfully perform only a certain number of memory activation operations during that period in accordance with this specific number of possible charge operations. In some instances, system 200 may prevent memory operations that would exceed the power parameters corresponding to a particular design.

To limit the number of memory operations performed in a given period of time, system 200 may specify, for each memory controller 220, a limit on the number of commands that can be issued during that period. One example of such a parameter is $T_{TAW}$ (two activation window), which specifies a time period during which a given memory controller can perform only two memory activations (e.g., two row accesses). A similar, but less restrictive parameter, $T_{FAW}$, is discussed further below. A problem with limiting the number of commands in this manner is that one memory controller may quickly use its allotted two commands, while another memory controller does not use its allotted commands, thus creating an inefficient use of memory resources.

As will be described below, in various embodiments, system 200 may, alternatively, establish a pool of credits for performing memory operations. The pool of credits may be administered by an arbitration unit. In some instances, usage of the arbitration unit may improve utilization of voltage converter 230 for performing memory operations.

Figure 3:
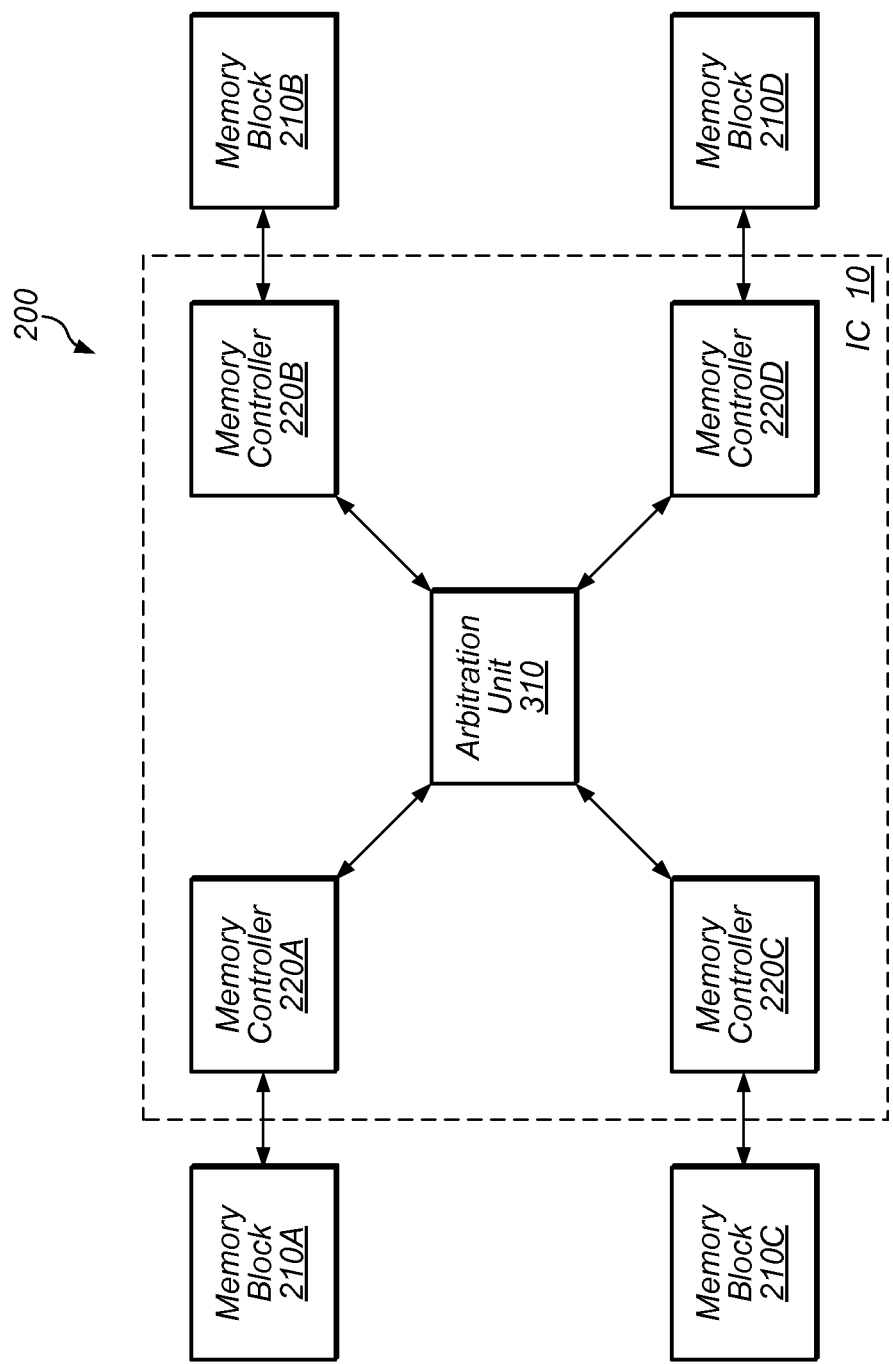
FIG. 3 is a block diagram of one embodiment of a memory system that includes an arbitration unit.

Turning now to FIG. 3, a block diagram of one embodiment of system 200 that includes an arbitration unit 310 is depicted. In illustrated embodiment, arbitration unit 310 is coupled to memory controllers 220A-D and located on IC 10. In other embodiments, arbitration unit 310 may be located elsewhere. In some embodiments, arbitration unit 310 may be coupled to a different number of memory controllers 220 than shown in FIG. 3. In some embodiments, IC 10 may include multiple arbitration units 310—e.g., each corresponding to a different voltage converter 230. In some embodiments, multiple units (e.g., controllers 220) may operate together to perform operations of arbitration unit 310.

Arbitration unit 310, in one embodiment, is configured to limit a number of memory operations performed during a given time window $T_W$. For example, if $T_W$ is 60 ns, arbitration unit 310 may ensure that, during any 60 ns period when unit 310 is an appropriate operating mode, no more than some specified number of operations (e.g., four) occurs. In various embodiments, the number of memory operations is a specified value that is based on the number of row access operations supported by voltage converter 230. In certain instances, the specified number of operations (which may be referred to herein as "N") may be specified by parameters of voltage converter 230. In one embodiment, voltage converter 230 has a parameter $T_{FAW}$, which specifies a time window during which no more than four memory activation requests may occur (thus N=4). This parameter may be based, for example, on the capacity of one or more charge pumps in voltage converter 230 to supply power to a memory. Thus, a voltage converter for a memory with a $T_{FAW}$ of 60 ns is typically designed to be able to supply sufficient power to perform four activation requests every 60 ns.

In some embodiments, the specified value is further based on the types of memory operations being performed (e.g., activation requests vs. refresh requests) and the different amounts of power that those types consume. For example, in one embodiment, arbitration unit 310 may be configured to limit the number of activation operations performed during a given time window $T_W$ (e.g., within 60 ns) to four activation operations. A greater or fewer number of refresh operations might be possible within this same time period if these operations consume, respectively, less or more power than activation requests.

To limit the number of memory operations performed during a given time window, arbitration unit 310, in one embodiment, is configured to receive requests to perform memory operations from memory controllers 220. In some embodiments, these requests may include activation requests to perform activation operations. In some embodiments, these requests may include refresh requests to perform refresh operations. In one embodiment, arbitration unit 310 is configured to then grant requests received from memory controllers 220, and to grant no more than the specified number of requests (N) during the time window $T_W$. In one embodiment, memory controllers 220 are configured to wait to send commands to memory blocks 210 until the requests corresponding to those commands have been granted by arbitration unit 310. Once a request for a memory operation has been granted, a memory controller 220, in one embodiment, is configured to then send the command for that memory operation to a memory block 210. Thus, by limiting the sending of commands from memory controllers 220, arbitration unit 310, in various embodiments, is configured to prevent memory blocks 210 from performing more than the specified number of memory operations. However, arbitration unit 310 may also help ensure that as many memory operations as possible are performed during time window $T_W$. Thus, arbitration unit 310 may help ensure the efficient usage of the memory subsystem in some embodiments.

In one embodiment, arbitration unit 310 is configured to determine whether to grant requests based on a stored value that identifies a current number of credits. In some embodiments, the current number of credits represents the current number of memory operations that have been granted during the time window. As requests are granted, arbitration unit 310 may be configured to increase the number of credits. After the number of credits reaches a threshold value corresponding to a maximum number of permitted operations, arbitration unit 310, in one embodiment, is configured to stop granting requests until the time window ends. Once a request has been granted, arbitration unit 310, in one embodiment, is configured to decrement the current number of credits after waiting for the length of the time window. Conversely, in some embodiments, the current number of credits represents the current number of remaining memory operations that can be granted during a current time window. Accordingly, arbitration unit 310 may be configured to decrease the number of credits as requests are granted, and to increase the number of credits once sufficient time has passed since granting requests. In some embodiments, arbitration unit 310 may be configured to adjust the current number of credits differently depending on the type of operation being requested. For example, in one embodiment, a refresh for a refresh operation may consume more credits than a request for activation operation, or vice versa.

In one embodiment, N (e.g., three) counters may be used to keep track of the last N activation (or refresh) commands. Every time an activation command is issued, a counter is loaded with a preset value corresponding to the amount of credit consumed by the command. The counter is then decremented every clock period to indicate a credit earned in that period of time. An activation command cannot be issued until there is at least one or more counter that is zero.

Arbitration unit 310 may grant requests in variety of different ways. In some embodiments, arbitration unit 310 is configured to grant requests as they are received (i.e., in a first-in-first-out (FIFO) manner). In other embodiments, arbitration unit 310 may be configured to grant requests in a round-robin manner. For example, in one embodiment, arbitration unit 310 is configured to grant initial requests from memory controllers 220 prior to granting additional requests from memory controllers 220 during the time window. In some embodiments, arbitration unit 310 is configured to identify the memory controller 220 that has the highest number of outstanding requests, and to grant a request of that controller 220 prior to granting outstanding requests of other memory controllers 220. In some embodiments, arbitration unit 310 is configured to grant requests based on the types of memory operations being requested. For example, in one embodiment, arbitration unit 310 may be configured to grant requests for refresh operation before granting requests for activation operations, as refresh operations may be more time sensitive than activation operations. In some embodiments, arbitration unit 310 is configured to grant requests based on prioritization information received from memory controllers 220. For example, in one embodiment, memory controllers 220 may be configured to specify that certain requests are more important than others based on some specified criteria. The present disclosure is not limited in the type of prioritization scheme that may be utilized.

Figure 4:
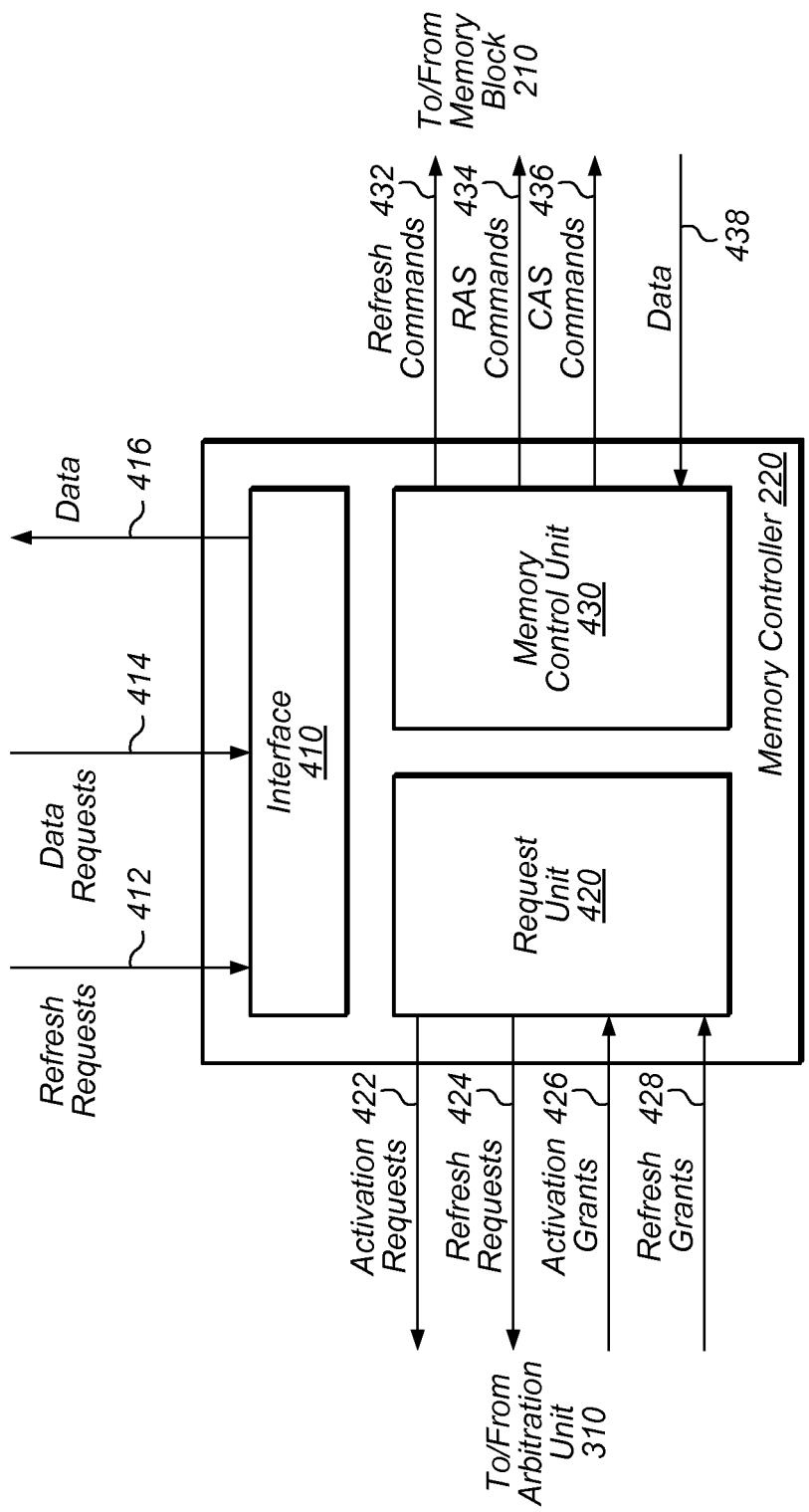
FIG. 4 is a block diagram of one embodiment of a memory controller.

Turning now to FIG. 4, a block diagram of a memory controller 220 is depicted. As discussed above, memory controller 220 is one embodiment of a memory controller that is configured to receive requests from an integrated circuit and to generate corresponding commands for performing memory operations. In various embodiments, upon receiving a request from IC 10, memory controller 220 is configured to provide one or more corresponding requests to arbitration unit 310. In the illustrated embodiment, memory controller 220 includes interface 410, request unit 420, and memory control unit 430.

Interface 410, in one embodiment, is configured to coordinate communication between IC 10 and memory controller 220. In the illustrated embodiment, interface 410 is configured to receive refresh requests 412 and data requests 414, and to provide data 416. In one embodiment, refresh requests 412 are requests to perform refreshes on a memory block 210; refresh requests may also be generated internally by a memory controller 220 using a timer. In one embodiment, data requests 414 are requests to perform read or write operations. In one embodiment, data 416 is data received in response to requested read operations. In various embodiments, interface 410 may be configured to receive requests 412 and 414 from any suitable sources such as graphics unit 36, CPU 14, NRT peripherals 20, and RT peripherals 22 described above in conjunction with FIG. 1. Similarly, in various embodiments, interface 410 may be configured to provide data 416 to any suitable destinations such as graphics unit 36, CPU 14, NRT peripherals 20, and RT peripherals 22.

Request unit 420, in one embodiment, is configured to provide requests to arbitration unit 310 based on requests received by interface 410. In the illustrated embodiment, request unit 420 is configured to provide activation requests 422 and refresh requests 424. As described above, activation requests 422 are requests to perform activation operations (e.g., to read and write data). In some embodiments, activation requests 422 may specify priority information indicating the importance of those requests 422. In one embodiment, refresh requests 424 are requests to perform refresh operations. In some embodiments, refresh requests 424 may specify a number of rows on which a refresh operation is to be performed. Accordingly, in one embodiment, arbitration unit 310 configured to adjust the current number of credits proportional to the number of specified rows. In one embodiment, request unit 420 is further configured to receive indications when requests have been granted. In the illustrated embodiment, request unit 420 is configured to receive activation grants 426 and refresh grants 428 corresponding to send activation requests 422 and refresh requests 424, respectively.

Memory control unit 430, in one embodiment, is configured to issue commands to one or more memory blocks 210 to perform memory operations in response to the requests of those operations being granted. In the illustrated embodiment, memory control unit 430 is configured to issue refresh commands 432 to perform refresh operations and RAS commands to perform RAS operations. In the illustrated embodiment, memory control unit 430 is further configured to issue CAS commands 436 without requesting to perform those commands 436. In the illustrated embodiment, memory control unit 430 is also configured to receive data 438 for CAS commands 436 that are associated with read requests. (More generally, memory controller 220 may issue activation requests via 434/436.)

In systems with a plurality of memory controllers 220, each memory controller may be configured to issue commands independently of one another. Thus, memory controller 220A may be configured to attempt issue an activation request at substantially the same time as one or more other memory controllers 220, without any "awareness" of any demands other controllers are making on the memory system. Accordingly, a memory controller 220 that issues a command to a memory system without being restricted by the other memory controller from doing so acts independently from the other memory controller. This independence may result in contention for the memory system (e.g., too many requests being made at once, particularly where there are a number of memory controllers 220). One embodiment of an arbitration unit that may ameliorate such contention and help ensure efficient usage of the memory system is described next.

Figure 5:
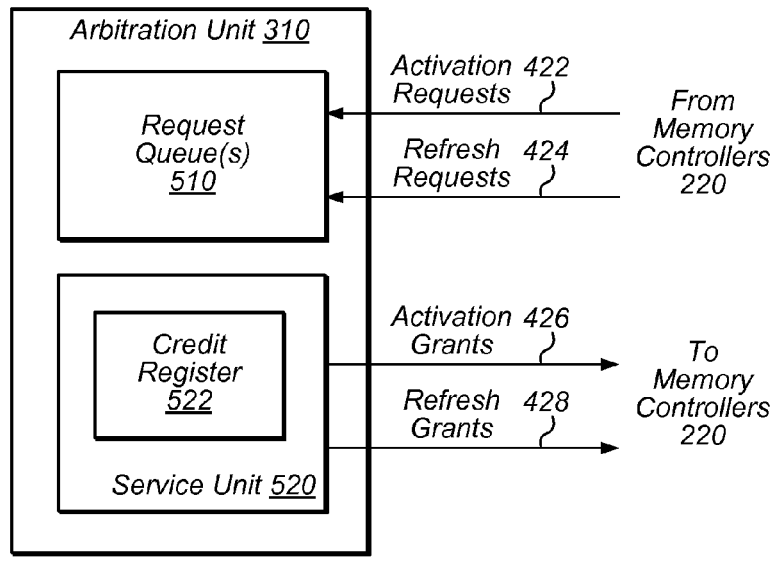
FIG. 5 is a block diagram of one embodiment of an arbitration unit.

Turning now to FIG. 5, a block diagram of arbitration unit 310 is depicted. As discussed above, arbitration unit 310 is one embodiment of circuitry that is configured to limit a number of memory operations performed during a given time window. In the illustrated embodiment, arbitration unit 310 includes one or more request queues 510 and service unit 520, which includes credit register 522.

Request queues 510, in one embodiment, are configured to store requests received from memory controllers 220 while the requests are waiting to be granted. In the illustrated embodiment, queues 510 are configured to store activation requests 422 and refresh requests 424. (Other types of requests are also possible.) In various embodiments, queues 510 may be organized based on the manner in which service unit 520 (described below) is configured to grant requests. In some embodiments, each queue 510 may be configured to store requests received from a respective one of memory controllers 220. In some embodiments, different queues 510 may be configured to store different types of requests—e.g., one queue 510 for activation requests 422 and another queue 510 for refresh requests 424. In some embodiments, different queues 510 may be configured to store different priorities of requests—e.g., one queue 510 that stores higher-priority requests and another queue 510 that stores lower-priority requests (as defined by some predefined prioritization criteria). In other embodiments, queues 510 may be configured differently.

Service unit 520, in one embodiment, is configured to grant requests by servicing queues 510. In the illustrated embodiment, service unit is configured to provide activation grants 426 and refresh grants 428. (In embodiments with other types of requests, other types of grants are possible.) In the illustrated embodiments, service unit 520 is configured to determine whether to grant requests based on a current number of credits stored in credit register 522. As discussed above, in some embodiments, the current number of credits represents the current number of memory operations that have been performed during the time window. In other embodiments, the current number of credits represents the current number of remaining memory operations that can be performed during the time window.

Service unit 520 may service queues 510 in a variety of manners to grant requests. In some embodiments, if arbitration unit 310 has a single queue 510, service unit 520 may be configured to service that queue 510 in a FIFO manner. With DRAM, however, arbitration unit 310 may be implemented using multiple queues to prevent head-of-line blocking problems. In some embodiments, if arbitration unit 310 includes multiple queues 510, services unit 520 may be configured to service queues 510 in a round-robin or a weighted-round-robin manner.

Figure 6:
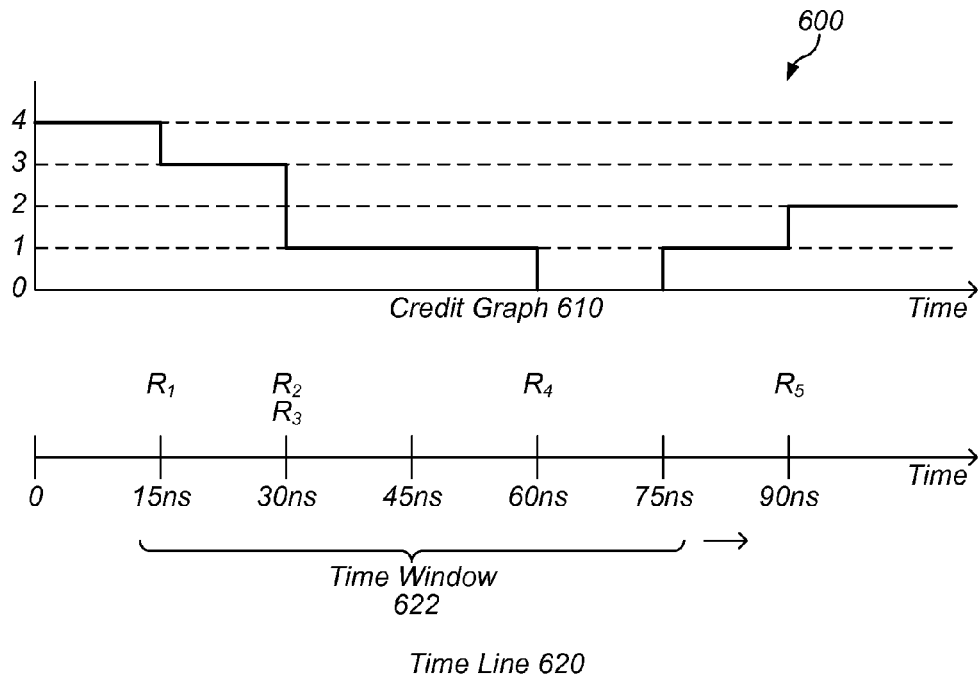
FIG. 6 is an exemplary diagram illustrating operation of one embodiment of the arbitration unit.

Turning now to FIG. 6, an exemplary diagram 600 illustrating operation of one embodiment of arbitration unit 310 is shown. In the illustrated embodiment, arbitration unit 310 is configured to grant requests based on a number of credits (e.g., 4), which indicate the number of remaining memory operations that can be performed during a time window (e.g., 60 ns). As shown, diagram 600 includes a credit graph 610, which illustrates the current number of credits that are available. Diagram also includes a time line 620, which depicts a series of requests $R_1$-$R_5$ as they are received over time. A specified period of time (here, 60 ns) is shown as time window 622—as discussed above, this time period may be based on one or parameters associated with a voltage converter of a memory system.

In diagram 600, four credits are available for consumption at a time of Ons since no requests have been received during this period. At a time of 15 ns, arbitration unit 310 receives an initial request $R_1$ and grants that request. Arbitration unit 310 then responds by decrementing the current number of credits from four to three. At a time of 30 ns, arbitration unit 310 receives and grants requests $R_2$ and $R_3$. (As discussed above, in various embodiments, the requests may originate from memory controllers acting independently of one another.)

Arbitration unit 310 then adjusts the number of credits accordingly. At a time of 60 ns, arbitration unit 310 receives and grants a fourth request $R_4$. Arbitration unit 310 then decrements the number of credits to zero. If any further requests are received (e.g., between 60 and 75 ns), arbitration unit 310 will not be able to grant those requests until additional credits are generated. At a time of 75 ns, arbitration unit 310 generates one credit because 60 ns (i.e., the length of time window 622) have transpired since granting request $R_1$. If arbitration unit 310 receives any requests at this point, arbitration unit 310 can grant one additional request. At a time of 90 ns, arbitration unit 310 unit receives and grants request $R_5$. Arbitration unit 310 then consumes one credit for request $R_5$ and generates two credits because 60 ns has transpired since granting requests $R_2$ and $R_3$. Accordingly, two credits remain available for granting requests. The incrementing and decrementing of the number of available credits may continue repeatedly while arbitration unit 310 is in an appropriate mode of operation.

Figure 7:
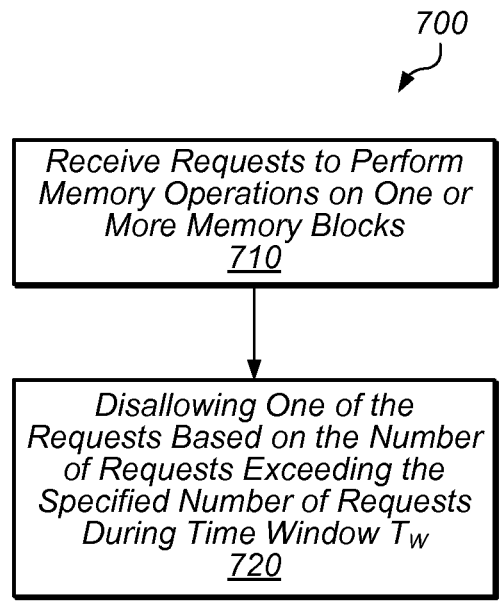
FIG. 7 is a flow diagram illustrating one embodiment of a method performed by the memory system.

Turning now to FIG. 7, a flow diagram of a method 700 is depicted. Method 700 is one embodiment of a method that may be performed by an integrated circuit that includes memory controllers and an arbitration unit, such as IC 10. In some instances, performing method 700 may improve utilization of power resources (e.g., voltage converter 230) used to facilitate memory operations.

In step 710, IC 10 (e.g., using memory controllers 220) generates requests to perform memory operations on one or more memory blocks (e.g. banks 214). In some embodiments, the requests may include activation requests (e.g., activation requests 422) generated in response to I/O requests (e.g., data requests 414) produced by IC 10 (e.g., from CPU 14, NRT peripherals 20, RT peripherals 22, or graphics unit 36). In some embodiments, the requests may include refresh requests (e.g., refresh requests 424) generated in response to corresponding refresh requests (e.g., refresh requests 412) produced by IC 10 (e.g., from CPU 14).

In step 720, IC 10 (e.g., using arbitration unit 310) grants no more than a specified number of requests during a time window $T_W$. In one embodiment, the specified number of requests is dependent on an amount of power generated by a voltage converter (e.g. voltage converter 230) that is configured to supply power for no more than a particular number of memory operations. In some embodiments, the specified number of requests may also be dependent on the types of memory operations being requested and the different amounts of power that those types consume. In one embodiment, IC 10 stores a value (e.g., in register 522) identifying a number of granted requests during the time window $T_W$. IC 10 then grants an additional request received in response to the value indicating that the number of granted requests does not exceed the specified number of requests. In some embodiments, IC 10 prioritizes the received requests according to one or more criteria, and grants the received requests based on the prioritizing. In various embodiments, IC 10 may use any of the various criteria described above.

Figure 8:
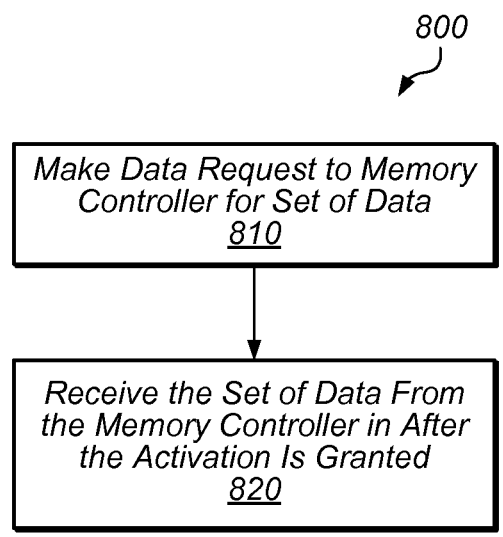
FIG. 8 is a flow diagram illustrating one embodiment of a method performed by an integrated circuit using the memory system.

Turning now to FIG. 8, a flow diagram of a method 800 is depicted. Method 800 is one embodiment of a method that may be performed by an integrated circuit that is requesting data (e.g., CPU 14, NRT peripherals 20, RT peripherals 22, or graphics unit 36 on IC 10). In some embodiments, the integrated circuit may or may not include memory controllers and/or an arbitration unit. In some instances, performing method 800 may improve utilization of power resources (e.g., voltage converter 230) used to perform memory operations.

In step 810, IC 10 (e.g., using CPU 14, NRT peripherals 20, RT peripherals 22, or graphics unit 36) provides a data request (e.g., data request 414) to a memory controller (e.g., one of memory controllers 220) for a set of data (e.g., data 416). As noted above, a data request may be a read requests or a write request. In one embodiment, the memory controller is configured to provide a corresponding activation request (e.g., activation request 422) to an arbitration unit (e.g., arbitration unit 310). In one embodiment, the arbitration unit is configured to grant no more than a specified number of activation requests received from multiple memory controllers (e.g., memory controllers 220) during a time window $T_W$. In some embodiments, IC 10 may also provide a refresh request (e.g., refresh request 412) to the memory controller or one of the other memory controllers.

In step 820, IC 10 receives the set of data (e.g., data 416) from the memory controller in response to an activation request being granted. (In the case of a write operation, the data 416 may be a write acknowledgement value sent from a memory controller 220 to other elements (e.g., CPU 14, NRT peripherals 20, RT peripherals 22, or graphics unit 36) in IC 10 to indicate that the write has been performed.) In various embodiments, the activation request may be granted using techniques described above in conjunction with step 720.

Exemplary Computer System

Figure 9:
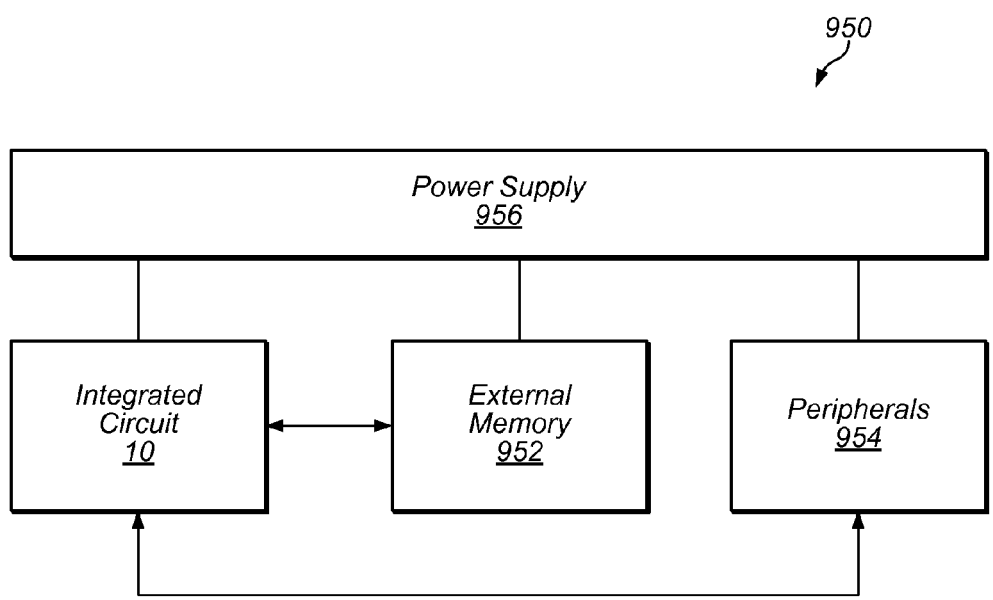
FIG. 9 is a block diagram of one embodiment of an exemplary system.

Turning next to FIG. 9 a block diagram of one embodiment of a system 950 is shown. In the illustrated embodiment, the system 950 includes at least one instance of an integrated circuit 10 coupled to an external memory 952. In one embodiment, system 950 may include a printed circuit board with elements 10, 952, 954, and 956. The external memory 952 may form the main memory subsystem discussed above with regard to FIG. 1 (e.g. the external memory 952 may include the memory 12A-12B). The integrated circuit 10 is coupled to one or more peripherals 954 and the external memory 952. A power supply 956 is also provided which supplies the supply voltages to the integrated circuit 958 as well as one or more supply voltages to the memory 952 and/or the peripherals 954. Power supply 956 may be different from voltage converter 230, which is described above as being located in memory (e.g., external memory 952) in certain embodiments. In some embodiments, more than one instance of integrated circuit 10 and external memory 952 may be included as well.

The memory 952 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. As mentioned above, external memory 952 may be Wide IO DRAM in one embodiment, organized using multiple dies, each having multiple channels (which in turn may each have multiple banks). One or more memory devices may be coupled onto a circuit board to form memory modules such as single inline memory modules (SIMMs), dual inline memory modules (DIMMs), etc. Alternatively, the devices may be mounted with an integrated circuit 10 in a chip-on-chip configuration, a package-on-package configuration, or a multi-chip module configuration.

The peripherals 954 may include any desired circuitry, depending on the type of system 950. For example, in one embodiment, the system 950 may be a mobile device (e.g. personal digital assistant (PDA), smart phone, etc.) and the peripherals 954 may include devices for various types of wireless communication, such as wifi, Bluetooth, cellular, global positioning system, etc. The peripherals 954 may also include additional storage, including RAM storage, solid state storage, or disk storage. The peripherals 954 may include user interface devices such as a display screen, including touch display screens or multitouch display screens, keyboard or other input devices, microphones, speakers, etc. In other embodiments, the system 950 may be any type of computing system (e.g. desktop personal computer, laptop, workstation, net top etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a plurality of memory controllers, wherein each memory controller is configured to generate requests to perform memory operations on a memory unit, wherein the memory unit includes a voltage converter having one or more charge pumps configured to supply power to the memory unit for no more than N memory operations during a time window TW, wherein N is at least two; and
an arbitration unit configured to grant requests received from ones of the plurality of memory controllers, wherein the arbitration unit is configured to grant no more than N requests during the time window TW.

2. The processor of claim 1, wherein the arbitration unit is configured to store a current value identifying a number of granted requests during the time window TW, and wherein the arbitration unit is configured to grant an additional request received from one of the plurality of memory controllers in response to the current value not exceeding N for the time window TW.

3. The apparatus of claim 1, wherein the generated requests include activation requests to perform activation operations on one or more blocks of memory within the memory unit, and wherein each memory controller is configured to independently send activation requests to the arbitration unit.

4. The apparatus of claim 3, wherein the generated requests include refresh requests to perform refresh operations on one or more blocks of memory within the memory unit.

5. An apparatus, comprising:
an arbitration unit, wherein the arbitration unit is configured to:
receive activation requests from a plurality of memory controllers, wherein each activation request is a request to perform a row access operation on a row in a memory;
identify one of the plurality of memory controllers as having a highest number of outstanding activation requests; and
grant an activation request of the identified memory controller in response to determining that the activation request is within a number N of permitted memory operations during a time window TW.

6. The apparatus of claim 5, wherein the memory is configured to supply power to perform N memory operations during the time window TW, and wherein N is at least two.

7. The apparatus of claim 5, wherein the arbitration unit is further configured to:
store received requests in a plurality of queues according to one or more criteria; and
grant stored requests by servicing the plurality of queues in a round-robin manner.

8. The apparatus of claim 5, wherein there are at least four memory controllers in the plurality of memory controllers, and wherein N is at least four.

9. An apparatus, comprising:
a plurality of memory controllers including a first memory controller and a second memory controller, wherein the first memory controller is configured to send commands via a first communication channel to perform refresh operations, wherein the second memory controller is configured to send commands via a second communication channel to perform refresh operations, and wherein the first and second memory controllers are configured to independently send commands to their respective communication channels;
an arbitration unit configured to receive refresh requests from ones of the plurality of memory controllers, wherein a refresh request includes a request to perform a refresh operation on one or more rows in a memory;
wherein the arbitration unit is further configured to grant no more than a number N of refresh requests during a time window TW.

10. The apparatus of claim 9, wherein the apparatus is configured to perform a specified number of charge operations during the time window TW, wherein each charge operation provides sufficient power to perform a refresh operation on at least a portion of the memory, and wherein N is at least two and depends on the specified number of charge operations.

11. The apparatus of claim 10, wherein the specified number of charge operations is N, and wherein the arbitration unit is further configured to receive activation requests from ones of the plurality of memory controllers, and wherein the arbitration unit is configured to grant no more than N total number refresh requests and activation requests during the time window TW.

12. The apparatus of claim 9, wherein a first refresh request specifies a number of rows on which a refresh operation is to be performed.

13. A method, comprising:
an arbitration unit receiving a plurality of requests from one of a plurality of memory controllers, wherein the plurality of requests include one or more activation requests and one or more refresh requests; and
the arbitration unit disallowing one of the plurality of requests based on the number of the plurality of requests exceeding a number N during a current time period TW, wherein N is at least two and depends on a maximum number of charge operations performable for a memory during the time period TW, wherein each charge operation provides sufficient power to perform a refresh operation on at least a portion of the memory.

14. The method of claim 13, further comprising:
a voltage converter generating an amount of power to perform N total activation operations and refresh operations during the time period TW.

15. The method of claim 13, further comprising:
the arbitration unit granting ones of the received requests according to prioritization criteria for ones of the plurality of memory controllers.

16. The method of claim 15, wherein the prioritization criteria specify a higher priority for refresh requests than for activation requests.

17. The method of claim 13, wherein the disallowing includes delaying one or more of the plurality of requests.

18. A method, comprising:
an integrated circuit making a first request to a first of a plurality of memory controllers, wherein the first memory controller is configured to make an activation request to an arbitration unit responsive to the first request, and wherein the arbitration unit is configured to grant no more than a specified number of requests received from the plurality of memory controllers during a time window TW;
the integrated circuit receiving a set of data from the first memory controller after the activation request is granted; and
the integrated circuit making a second request to a second of the plurality of memory controllers, wherein the second memory controller is configured to provide a refresh request to the arbitration unit responsive to the second request, and wherein the second memory controller is configured to provide a refresh command to the memory in response to the refresh request being granted.

19. The method of claim 18, wherein the plurality of memory controllers are configured to independently access a memory system, and wherein the memory system includes a charge pump unit configured to supply sufficient power to the memory system to perform the specified number of requests during the time window TW, wherein the specified number is at least two.

20. The method of claim 18, wherein the first request is a write request, and wherein the set of data is a write acknowledgement.

21. The method of claim 18, wherein the first request is a read request for the set of data.

* * * * *

UNITED STATES PATENT AND TRADEMARK OFFICE
CERTIFICATE OF CORRECTION

| | |
|---|---|
| PATENT NO. | : 8,533,403 B1 |
| APPLICATION NO. | : 12/895036 |
| DATED | : September 10, 2013 |
| INVENTOR(S) | : Patrick Y. Law |

Page 1 of 1

It is certified that error appears in the above-identified patent and that said Letters Patent is hereby corrected as shown below:

In the Claims:

In column 15, line 41 (claim 2), delete "The processor" and insert --The apparatus--.

Signed and Sealed this
Fifteenth Day of October, 2013

Teresa Stanek Rea
*Deputy Director of the United States Patent and Trademark Office*